K. KEMPNY.
TRAP.
APPLICATION FILED JULY 6, 1917. RENEWED MAY 10, 1918.
1,271,323.  Patented July 2, 1918.
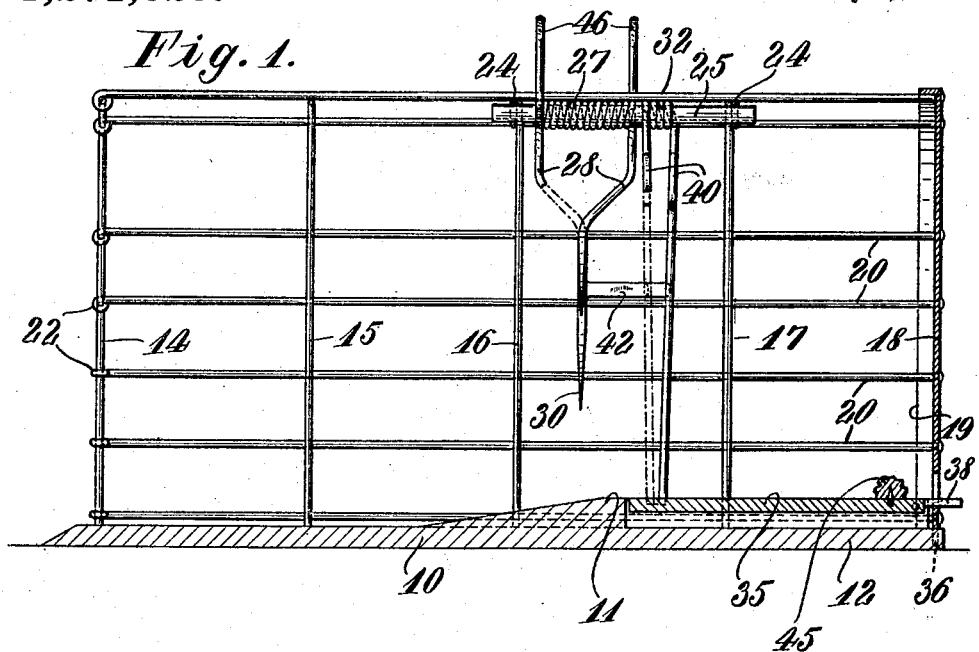
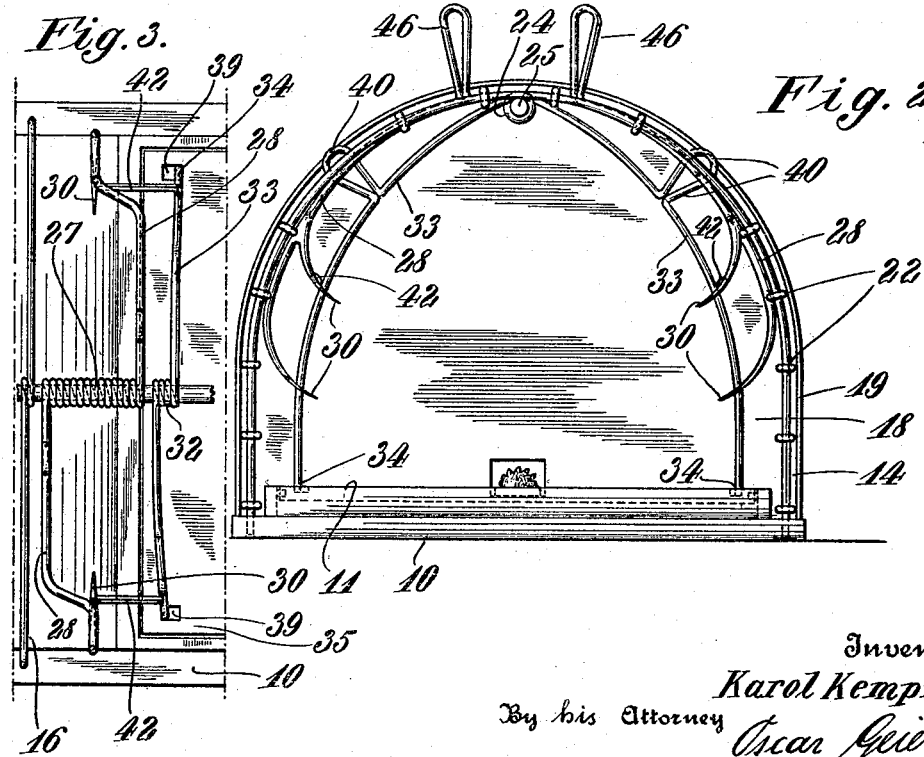
Inventor
Karol Kempny.
By his Attorney
Oscar Geier

UNITED STATES PATENT OFFICE.

KAROL KEMPNY, OF CLEVELAND, OHIO.

TRAP.

1,271,323. Specification of Letters Patent. Patented July 2, 1918.

Application filed July 6, 1917, Serial No. 179,001. Renewed May 10, 1918. Serial No. 233,786.

*To all whom it may concern:*

Be it known that I, KAROL KEMPNY, a subject of the Emperor of Austria, resident of Cleveland, county of Cuyahoga, and State of Ohio, have invented certain new and useful Improvements in Traps, of which the following is a specification.

This invention relates to improvements in animal traps, and has as its special object the provision of means whereby any of the smaller animals that may enter an inclosure under the enticement of a bait and contact with the platform upon which it is displayed, liberates a plurality of sharp prongs upon which the animal is impaled.

A further object is to provide a trap of the type described which may be cheaply constructed, easily operated, and which is effective in the accomplishment of its purpose.

These and other like objects are attained by the novel construction and combination of parts hereafter described and shown in the accompanying drawing, forming a material part of this disclosure, and in which:—

Figure 1 is a side elevational view of a trap made in accordance with the invention.

Fig. 2 is a front end view of the same, and

Fig. 3 is a fragmental top plan view of the same.

The base of the apparatus consists of a substantially rectangular wooden block 10, having a central transverse elevation 11, formed with a slanting face, and contiguous thereto is a lower portion 12.

Secured to the base are a plurality of arcuate wires 14, 15, 16 and 17, equally spaced over the trap, while at the rear is a plate 18, formed with flanges 19, in which are secured one end of a plurality of longitudinally disposed bars 20, forming in effect a cage netting or grating preventing an animal from passing out of the trap.

The front, opposite end of the bars 20 are formed with eyes 22 secured to the outer arcuate wire 14, the rods being further engaged by the intermediate arcuate wires 15, 16 and 17, by soldering or the like.

The wires 16 and 17 respectively are formed with loops 24 at their upper bends, in which is engaged a rod or bar 25, encircled by a coiled spring 27, formed integrally with the impaling elements 28, which are provided with a plurality of tapering, sharply pointed spurs 30, so bent and arranged as to face each other from opposite sides of the cage.

A second coiled spring 32, surrounds another part of the rod 25, having its ends extended and formed into curved rods 33, the extreme ends 34 being normally engaged in oppositely disposed recesses or depressions 39 of a plate 35, pivoted at 36 to the base and having an extension 38 by means of which the trap may be set.

Formed with the rods 33 are extending loops 40, by which resetting may be done and a greater amount of resiliency attained.

Rigidly secured upon the upper spurs 30 are lateral projections 42, engageable with the rods 33, in such manner as to hold the spurs widely apart.

In operation, the spurs being separated by pressing the extending loops 46 toward each other, and maintained in that condition by reason of the engagement of the projections 42 with the arcuate rods 33, their ends being in the recesses 39 of the pivoted plate 35, at that time raised by tipping the same by actuating the extension 38, any animal approaching the bait 45 will obviously tread upon the plate, causing the same to be depressed, thereby liberating the rods 33, and through them the extensions 42, allowing the spurs to be suddenly brought closely together, under influence of the spring 27, impaling the animal at that time partially upon the plate 35.

I claim:—

1. A trap comprising a rigid base, an arcuate cage disposed thereover, a pivoted platform upon which the bait may be displayed, a pair of spring elements engaged with said platform when in a raised condition, a bar upon which said spring elements are engaged at their upper ends, a pair of oppositely disposed, arcuate elements pivotally mounted upon said bar, means for normally constraining said elements toward each other, and a plurality of spurs formed on said arcuate elements.

2. In a trap of the class described, the combination with a rigid base, an arcuate cage disposed thereover, and a bait carrying platform pivoted at one end on said base, of a rod mounted in said cage, impaling elements pivoted on said rod, means for pressing said impaling elements toward each other, a pair of spring arms pivoted on said rod, means in said platform engageable with said arms whereby they are held normally extended, and means for releasing said impaling elements, upon the depression of said pivoted platform.

3. In a trap of the class described, the combination with a rigid base, an arcuate barred cage secured thereto, a platform pivoted in said base, said platform being adapted to carry a bait, spring arms engaged with said platform when in a raised position, a pair of oppositely disposed impaling elements mounted in said cage, means engageable with said arms whereby said impaling elements are held normally apart, means whereby said impaling elements are brought forcibly together when said arms are released, a resetting means formed with said impaling elements, and means extending from said platform whereby said trap may be reset.

In testimony whereof I have affixed my signature.

KAROL KEMPNY.

Copies of this patent may be obtained for five cents each, by addressing the "Commissioner of Patents, Washington, D. C."